United States Patent
Denison et al.

(10) Patent No.: US 12,524,598 B2
(45) Date of Patent: *Jan. 13, 2026

(54) SYSTEMS AND METHODS FOR GENERATING AND PROCESSING ELECTRONIC FORMS

(71) Applicant: Capital One Services, LLC, McLean, VA (US)

(72) Inventors: Robert Denison, Richmond, VA (US); William Cardinale, Massapequa Park, NY (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/449,467

(22) Filed: Aug. 14, 2023

(65) Prior Publication Data

US 2024/0104289 A1    Mar. 28, 2024

Related U.S. Application Data

(63) Continuation of application No. 17/935,270, filed on Sep. 26, 2022, now Pat. No. 11,727,189.

(51) Int. Cl.
*G06Q 10/10* (2023.01)
*G06F 40/103* (2020.01)
*G06F 40/174* (2020.01)
*G06F 40/186* (2020.01)

(52) U.S. Cl.
CPC .......... *G06F 40/103* (2020.01); *G06F 40/174* (2020.01); *G06F 40/186* (2020.01)

(58) Field of Classification Search
CPC .... G06F 40/103; G06F 40/174; G06F 40/186; G06Q 10/10
See application file for complete search history.

(56) References Cited

U.S. PATENT DOCUMENTS

| | | | |
|---|---|---|---|
| 9,396,664 B2 | 7/2016 | Rogers et al. | |
| 9,672,753 B2 | 6/2017 | Rogers et al. | |
| 10,621,280 B2 | 4/2020 | Jain et al. | |
| 2013/0117652 A1* | 5/2013 | Folsom | G06F 40/174 715/222 |
| 2017/0058047 A1* | 3/2017 | Lysanov | G06F 40/131 |
| 2019/0073348 A1* | 3/2019 | Cheesman | G06V 30/412 |
| 2019/0213242 A1* | 7/2019 | Pathak | G06F 40/174 |
| 2019/0236124 A1* | 8/2019 | Bumby | G06F 40/186 |

FOREIGN PATENT DOCUMENTS

WO    WO-2017058047 A1 *    4/2017    .......... G06F 16/904

* cited by examiner

*Primary Examiner* — Hassan Mrabi
(74) *Attorney, Agent, or Firm* — Bookoff McAndrews, PLLC

(57) ABSTRACT

A computer-implemented method of generating and processing electronic forms may include: generating and storing a plurality of prompts; receiving a first form request from a first user device; generating a first form including a first set of prompt instances; causing the first form to be displayed on the first user device; receiving a first set of user inputs, each of the first set of user inputs being associated with one or more of the first set of prompt instances; and storing the first set of prompt instances and the first set of user inputs while maintaining the plurality of prompts.

17 Claims, 7 Drawing Sheets

SYSTEMS AND METHODS FOR GENERATING AND PROCESSING ELECTRONIC FORMS

CROSS-REFERENCE TO RELATED APPLICATION(S)

This patent application is a continuation of, and claims the benefit of priority to, U.S. Nonprovisional patent application Ser. No. 17/935,270, filed on Sep. 26, 2022, the entirety of which is incorporated herein by reference.

TECHNICAL FIELD

Various embodiments of the present disclosure relate generally to systems and methods for generating and processing electronic forms.

BACKGROUND

Individuals and enterprises may use electronic forms for a variety of purposes. Electronic forms may facilitate collection of information that may subsequently be compiled, analyzed, and/or used in decision making. Collection and maintenance of the information over time may be fairly simple if the electronic forms remain static. Business processes and commercial realities that drive the need for electronic forms, however, may change over time, thereby triggering changes in the electronic forms. As existing electronic forms change over time, the information collected and maintained may become obsolete and/or difficult to use due to the changes.

The present disclosure is directed to addressing the above-referenced challenges. The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY OF THE DISCLOSURE

According to certain aspects of the disclosure, systems and methods for generating and processing electronic forms are described.

In one example, a computer-implemented method of generating and processing electronic forms may include: generating and storing a plurality of prompts, each of the plurality of prompts including a user input field and at least one of a plurality of association tags; receiving a first form request from a first user device, the first form request indicating at least one of the plurality of association tags; generating, based on the first form request, a first form including a first set of prompt instances, wherein each of the first set of prompt instances may correspond to one or more of the plurality of prompts; causing the first form to be displayed on the user device; receiving, from the first user device, a first set of user inputs, each of the first set of user inputs being associated with one or more of the first set of prompt instances; and storing the first set of prompt instances and the first set of user inputs while maintaining the plurality of prompts.

In another example, a system for generating and processing electronic forms may include: one or more memories storing instructions; and one or more processors operatively connected to the one or more memories. The one or more processors may be configured to execute the instructions to: generate and store a plurality of prompts, each of the plurality of prompts including a user input field and at least one of a plurality of association tags; receive a first form request from a first user device, the first form request indicating at least one of the plurality of association tags; generate, based on the first form request, a first form including a first set of prompt instances, wherein each of the first set of prompt instances may correspond to one or more of the plurality of prompts; cause the first form to be displayed on the user device; receive, from the first user device, a first set of user inputs, each of the first set of user inputs being associated with one or more of the first set of prompt instances; and store the first set of prompt instances and the first set of user inputs while maintaining the plurality of prompts.

In a further example, a system for generating and processing electronic forms may include: one or more memories storing instructions; and one or more processors operatively connected to the one or more memories. The one or more processors may be configured to execute the instructions to: generate and store a plurality of prompts, each of the plurality of prompts including a user input field and at least one of a plurality of association tags; receive a first form request from a first user device, the first form request indicating at least one of the plurality of association tags; generate, based on the first form request, a first form including a first set of prompt instances, wherein each of the first set of prompt instances may correspond to one or more of the plurality of prompts; cause the first form to be displayed on the user device; receive, from the first user device, a first set of user inputs, each of the first set of user inputs being associated with one or more of the first set of prompt instances; store the first set of prompt instances and the first set of user inputs while maintaining the plurality of prompts; generate a set of additional prompts and combine the set of additional prompts with the plurality of prompts to form a modified plurality of prompts; receive a second form request from a second user device; generate, based on the second form request, a second form including a second set of prompt instances, wherein each of the second set of prompt instances may correspond to one or more of the modified plurality of prompts; receive, from the second user device, a second set of user inputs, each of the second set of user inputs being associated with one or more of the second set of prompt instances; and store the second set of prompt instances and the second set of user inputs while maintaining each of the modified plurality of prompts, the first set of prompt instances, and the first set of user inputs.

Additional objects and advantages of the disclosed embodiments will be set forth in part in the description that follows, and in part will be apparent from the description, or may be learned by practice of the disclosed embodiments.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION OF EMBODIMENTS

Figure 1:
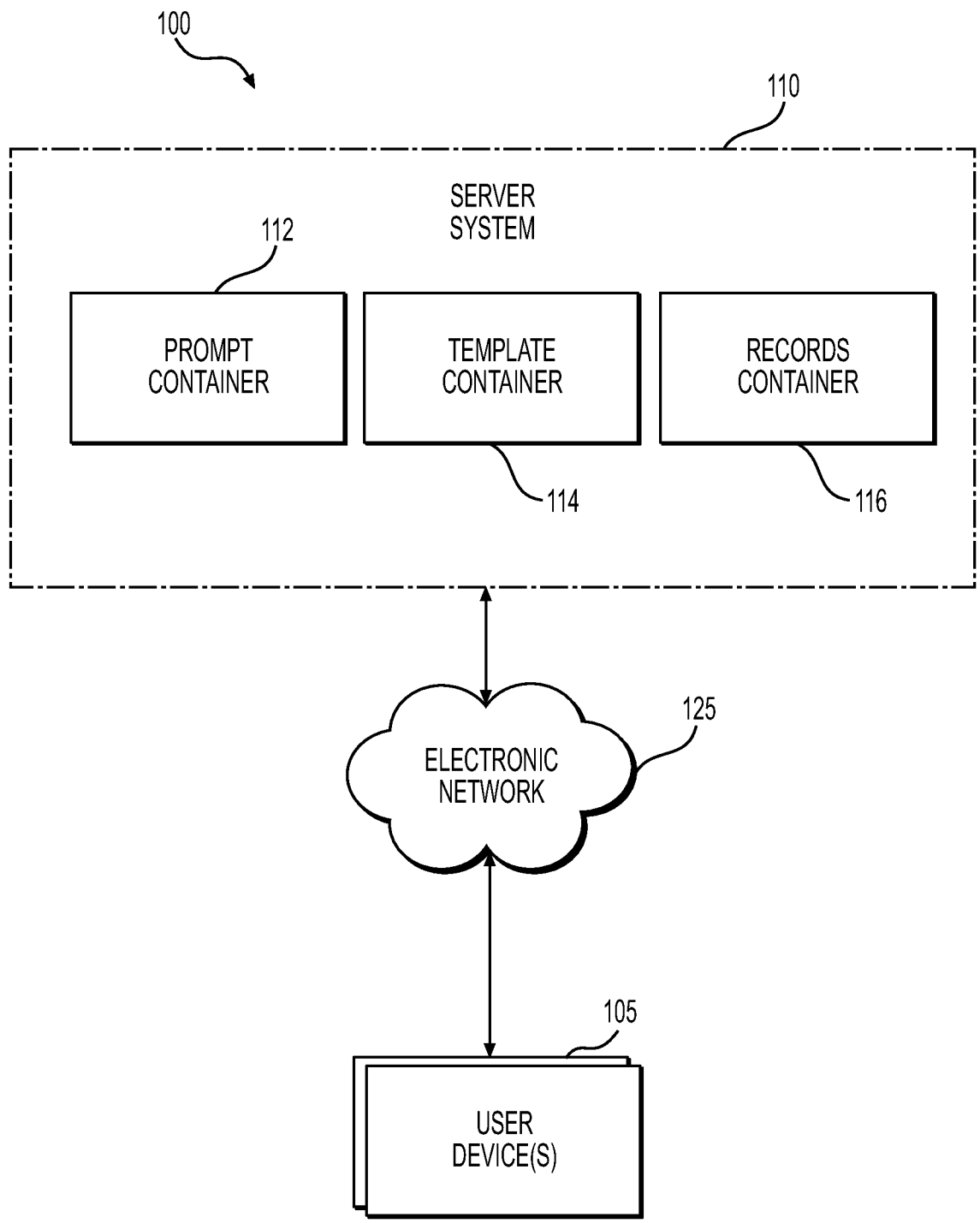
FIG. 1 depicts an exemplary system infrastructure, according to one or more embodiments.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section. Both the foregoing general description and the following detailed description are exemplary and explanatory only and are not restrictive of the features, as claimed.

In this disclosure, the term "based on" means "based at least in part on." The singular forms "a," "an," and "the" include plural referents unless the context dictates otherwise. The term "exemplary" is used in the sense of "example" rather than "ideal." The terms "comprises," "comprising," "includes," "including," or other variations thereof, are intended to cover a non-exclusive inclusion such that a process, method, or product that comprises a list of elements does not necessarily include only those elements, but may include other elements not expressly listed or inherent to such a process, method, article, or apparatus. Relative terms, such as, "substantially" and "generally," are used to indicate a possible variation of ±10% of a stated or understood value.

It will also be understood that, although the terms first, second, third, etc. are, in some instances, used herein to describe various elements, these elements should not be limited by these terms. These terms are only used to distinguish one element from another. For example, a first user device could be termed a second user device, and, similarly, a second user device could be termed a first user device, without departing from the scope of the various described embodiments. The first user device and the second user device are both user devices, but they are not the same user device.

In general, the present disclosure is directed to systems and methods for generating and processing electronic forms. The methods and systems according to the present disclosure offer significant technical benefits which will become apparent.

Electronic forms may be used for a variety of purposes and applications. For example, electronic forms may be used to facilitate collection of information within a business enterprise from multiple employees, multiple business units, or even multiple companies. Electronic forms may include questionnaires, checklists, surveys, spreadsheets, or any other suitable form for collecting information. Information collected via electronic forms may subsequently be compiled, analyzed, and/or used in decision making. In some instances, data extracted from electronic forms may be used to improve an enterprise's products and/or services. In some instances, data extracted from electronic forms may be used to ensure an enterprise's mission is being carried out.

In larger enterprises, information may be collected from many different sources and over a period of time. If the electronic forms remain static, collection and maintenance of the information over time may be relatively simple. Business process and commercial realities that drive the need for electronic forms, however, may change over time, thereby necessitating changes in the electronic forms. Changes in electronic forms over time may cause ripple effects through the information they are used to collect. For example, a first version of an electronic form may be used to collect information during a first time period. Subsequently, the electronic form may be significantly modified, yielding a second version. The electronic form may be modified for any number of reasons, such as to target newly available information, to avoid information that has become irrelevant, or the like. Though many of the prompts within the second version of the form may remain the same or similar to the prompts of the first version, it may become difficult or impossible to match and/or compare information extracted via the first version to information extracted via the second version. Depending on the enterprise's data management and analytics practices, this may cause large amounts of information to become obsolete and/or unusable.

Accordingly, a need exists to address the foregoing challenges. Particularly, a need exists to improve tools for generating and processing electronic forms, especially in environments in which the electronic forms are dynamic and are used to collect information from multiple sources. Embodiments of the present disclosure offer technical solutions to address the foregoing needs, as well as other needs.

FIG. 1 depicts an exemplary computing environment 100 that may be utilized with techniques presented herein. One or more user device(s) 105 and a server system 110 may communicate across an electronic network 125. The user device 105 may be associated with, and used by, a user. The systems and devices of the computing environment 100 may communicate in any arrangement. As will be discussed herein, systems and/or devices of the computing environment 100 may communicate in order to generate and process electronic forms.

The user device 105 may be a computer system such as, for example, a desktop computer, a mobile device, etc. In an exemplary embodiment, the user device 105 may be a cellphone, a tablet, or the like. In some embodiments, the user device 105 may include one or more electronic application(s), e.g., a program, plugin, browser extension, etc., installed on a memory of the user device 105. In some embodiments, the electronic application(s) may be associated with one or more of the other components in the computing environment 100. For example, the electronic application(s) may include a web browser, another application, or the like configured to allow access to products or services offered by an enterprise. In some embodiments, the electronic applications may include customer relationship management (CRM) software and/or a web browser configured to access such CRM software.

Server system 110 may be a computer system for hosting, running, and/or maintaining software accessible by user device 105. Server system 110 may comprise one or more server devices and the one or more server devices may be located in one or more physical locations. For example, server system 110 may exist within a cloud infrastructure supported by a plurality of server devices distributed across multiple geographical locations. Server system 110 may include various database(s) configured to store data and may specifically include a prompt container 112, a template container 114, and a records container 116. In some embodiments, each of prompt container 112, template container 114, and records container 116 may exist on physically separate storage media. In some embodiments, each of prompt container 112, template container 114, and records container 116 may exist within separate partitions of one or more storage media. In some embodiments, prompt container 112, template container 114, and records container 116 may coexist on the same storage media and/or in the same partition.

Prompt container 112 may store a plurality of prompts for use with electronic forms. The nature of the prompts will be described in further detail hereinafter, including with reference to FIG. 3. The prompts may be accessible via user device 105 using one or more applications configured for generation and processing of electronic forms. In some embodiments, user device 105 may be configured to generate and/or cause generation of prompts to be stored within prompt container 112. In some embodiments, the prompts may be editable by user device 105. One or more prompts may be retrieved from prompt container 112 when generating an electronic form.

Template container 114 may store a plurality of electronic form templates for generating electronic forms. Each template stored in template container 114 may define one or more prompts to be included in an electronic form and may further define an arrangement of the prompts within the electronic form. For example, in some embodiments the prompts may be questions and a particular template may define a list and order of questions to be included in an electronic form. Templates within template container 114 may be accessible via user device 105 using one or more applications configured for generation and processing of electronic forms. In some embodiments, user device 105 may be configured to generate and/or cause generation of templates to be stored within template container 114. In some embodiments, the templates may be editable by user device 105. To generate an electronic form, a user may select a template via user device 105, the template may be retrieved from template container 114 by server system 110, and the electronic form may be generated using the template.

Records container 116 may store data relating to electronic forms other than prompts and/or templates. In some embodiments, records container 116 may contain data corresponding to values entered into electronic forms and/or any associated metadata. For example, a user may enter information into an electronic form via user device 105. In some embodiments, the electronic form may include a series of prompt instances into which the user may enter values. The prompt instances and values entered by the user may be stored in records container 116. Further, any metadata associated with the values and/or prompts may also be stored in records container 116. Metadata could include an identity of the user, an identity of a group to which the user belongs, a date and/or time that a value was entered, or any other relevant metadata.

Server system 100 may further include other data structures, containers, or objects for arranging the information stored thereon and for directing workflow. For example, prompts, templates, and/or records may be associated in a review object by which a business workflow for completing forms is arranged. The review object may include context for forms, e.g. pass or fail status, stages of workflow, and user comments.

In various embodiments, the electronic network 125 may be a wide area network ("WAN"), a local area network ("LAN"), personal area network ("PAN"), or the like. In some embodiments, electronic network 125 may be a secured network. In some embodiments, the secured network may be protected by any of various encryption techniques. In some embodiments, electronic network 125 may include the Internet, and information and data provided between various systems occurs online. "Online" may mean connecting to or accessing source data or information from a location remote from other devices or networks coupled to the internet. Alternatively, "online" may refer to connecting or accessing an electronic network (wired or wireless) via a mobile communications network or device. The Internet is a worldwide system of computer networks—a network of networks in which a party at one computer or other device connected to the network can obtain information from any other computer and communicate with parties of other computers or devices. The most widely used part of the Internet is the World Wide Web (often-abbreviated "WWW" or called "the Web"). In some embodiments, the electronic network 125 includes or is in communication with a telecommunications network, e.g., a cellular network.

Although depicted as separate components in FIG. 1, it should be understood that a component or portion of a component may, in some embodiments, be integrated with or incorporated into one or more other components. Any suitable arrangement of the various systems and devices of the computing environment 100 may be used.

Figure 2:
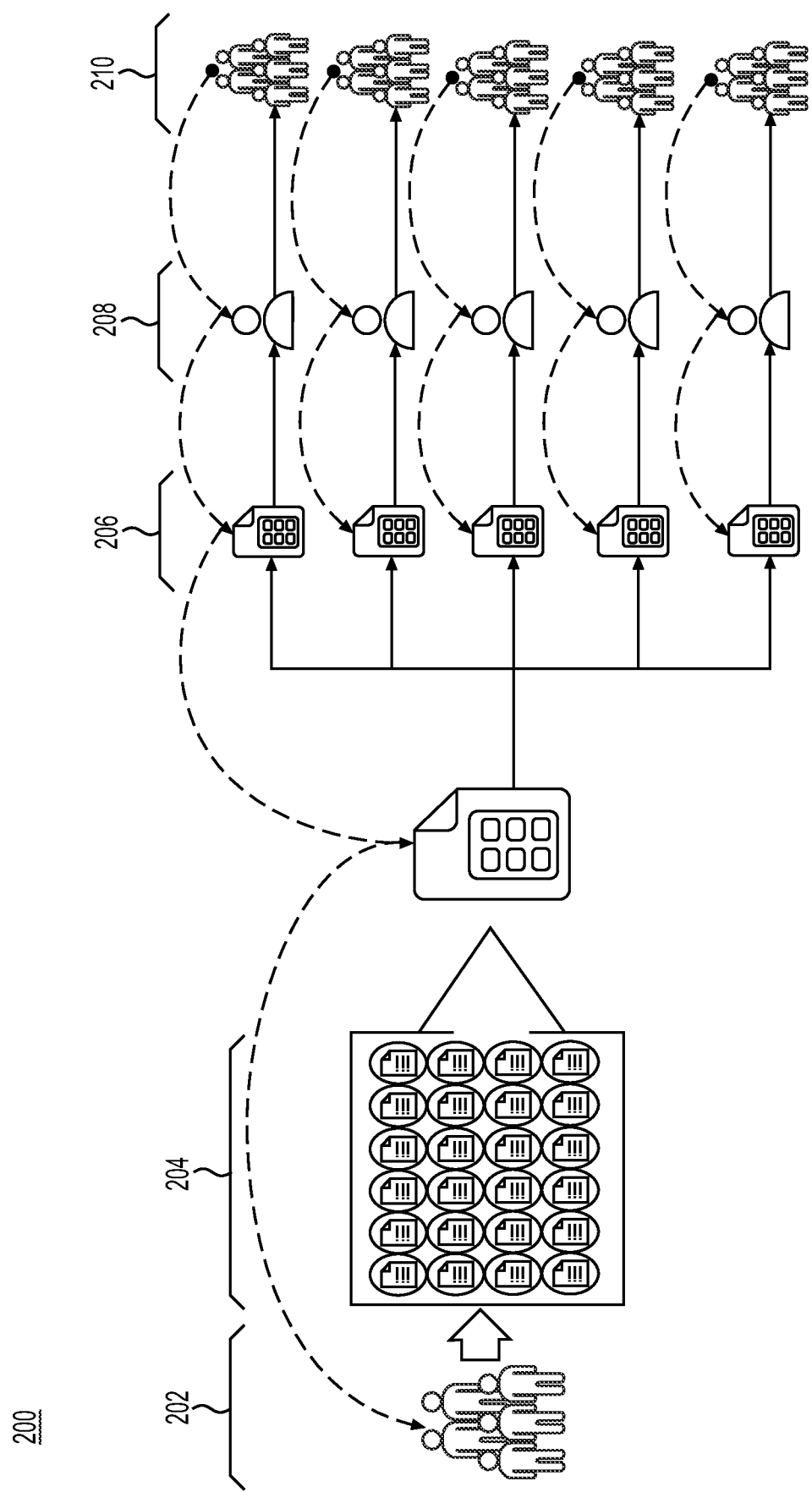
FIG. 2 depicts a flow diagram of an exemplary process for generating and processing electronic forms, according to one or more embodiments.

FIG. 2 illustrates an exemplary process flow 200 for processing electronic forms over which the systems and methods described herein represent a technological improvement. By way of example only, process flow 200 is described herein in the context of quality control performed in an enterprise setting. Process flow 200 depicts an example of how quality control information may flow from a quality control department to product owners.

As shown, process flow 200 may include a first group of users 202. As an example, first group 202 may represent a quality control department of an enterprise. Individual users of first group 202 may retrieve an electronic form from electronic form repository 204 when assigned to perform a quality review. The quality review may be assigned for any relevant business activity or product of the enterprise. An electronic form may contain a list of questions that a user is expected to answer by entering one or more values into designated fields as part of the quality review.

Upon completion of an electronic form, the entered values may be merged into a central document. The central document may be replicated multiple times as central document copies 206. Central document copies 206 may then be distributed to managers 208 who share the results with second groups of users 210. The second groups of users 210 may include product owners for various products and/or services of the enterprise. Managers 208 and corresponding second groups of users 210 may represent business units of the enterprise, for example. Upon receipt of central document copies 206, managers 208 and second groups of users 210 may analyze the values entered by first group 202 and may update products and/or services, as necessary.

Process flow 200 illustrates significant shortcomings, however. For example, because electronic forms are completed by first group 202 and merged into a single central document used by multiple managers 208 and users 210, there is significant risk that data contained within the central document may become disorganized or corrupted. Additionally, the electronic forms of electronic form repository 204 may need to be updated periodically for any number of reasons, such as changes in the enterprise's products or services, evolving business practices, or the like. Updating the electronic forms, however, while maintaining intelligible historical records in the central document may be difficult or impossible. Changing or deleting a question from an electronic form, for example, may render the central document unusable moving forward or may render the historical data contained therein unintelligible.

Figure 3:
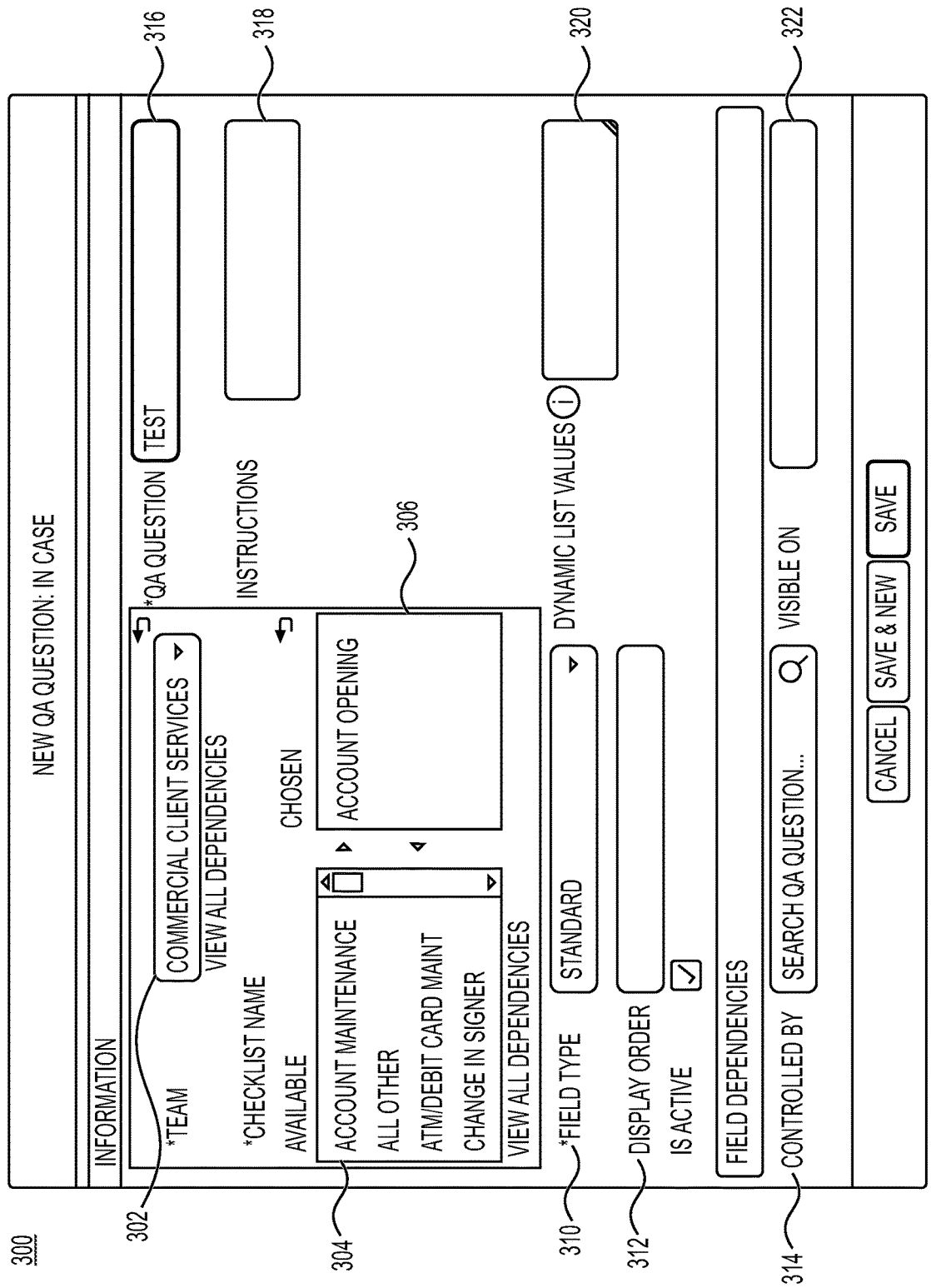
FIG. 3 depicts an exemplary interface for generating a prompt, according to one or more embodiments.

To mitigate and/or avoid the shortcomings of process flow 200, electronic forms may instead be generated in part using instantiated prompts. FIG. 3 illustrates an example of a prompt creation dashboard 300. Prompt creation dashboard 300 may be used, for example, by a user of user device 105 to generate a prompt for use in electronic forms and to define parameters for the prompt. The prompt creation dashboard 300 may include a plurality of fields into which information may be entered to define a prompt. In some embodiments, prompt creation dashboard 300 may include a team field 302. Team field 302 may allow a user to define a team or department to which the prompt is applicable. Prompt creation dashboard 300 may also include a checklist name repository 304 and a checklist name field 306. A user may select and/or drag items from checklist name repository 304 to checklist name field 306 to associate the prompt with a particular checklist, or electronic form. Prompt creation dashboard 300 may also include a field type field 310 via which a user may select a manner by which information is entered into the prompt. For example, field type field 310 may define whether the prompt is configured to be fillable via a drop down menu with a list of predetermined items, is configured to be fillable via a drop down menu with a list of custom items, is configured for free text entry of an alphanumeric text string, or is configured to receive information in another suitable manner.

Prompt creation dashboard 300 may further include display order field 312. A user may use display order field 312 to define a position in which the prompt appears in an electronic form relative to other prompts. Prompt creation dashboard 300 may further include a controlled by field 314 in which the user may define a custodian of the prompt. Prompt creation dashboard 300 may further include a QA question field 316 in which the user may define a name of the prompt. Prompt creation dashboard 300 may further include an instructions field 318 in which the user may enter text instructions for the prompt. Prompt creation dashboard 300 may further include dynamic list values field 320 in which a user may define values that change and/or are dependent on other data.

Information entered into fields 302 to 322 may collectively define at least (1) the information requested when the prompt is incorporated into an electronic form, (2) how the requested information is entered into the electronic form, and/or (3) the criteria by which the prompt is selected for inclusion in an electronic form. For example, information entered into field 302 to 322 may serve as filter tags. When creating an electronic form, a user may select for incorporation into the form all prompts associated with Commercial Client Services (team field 302). When the user has entered all desired information into field 302 to 322, the user may save the resulting prompt to prompt container 112.

Figure 4:
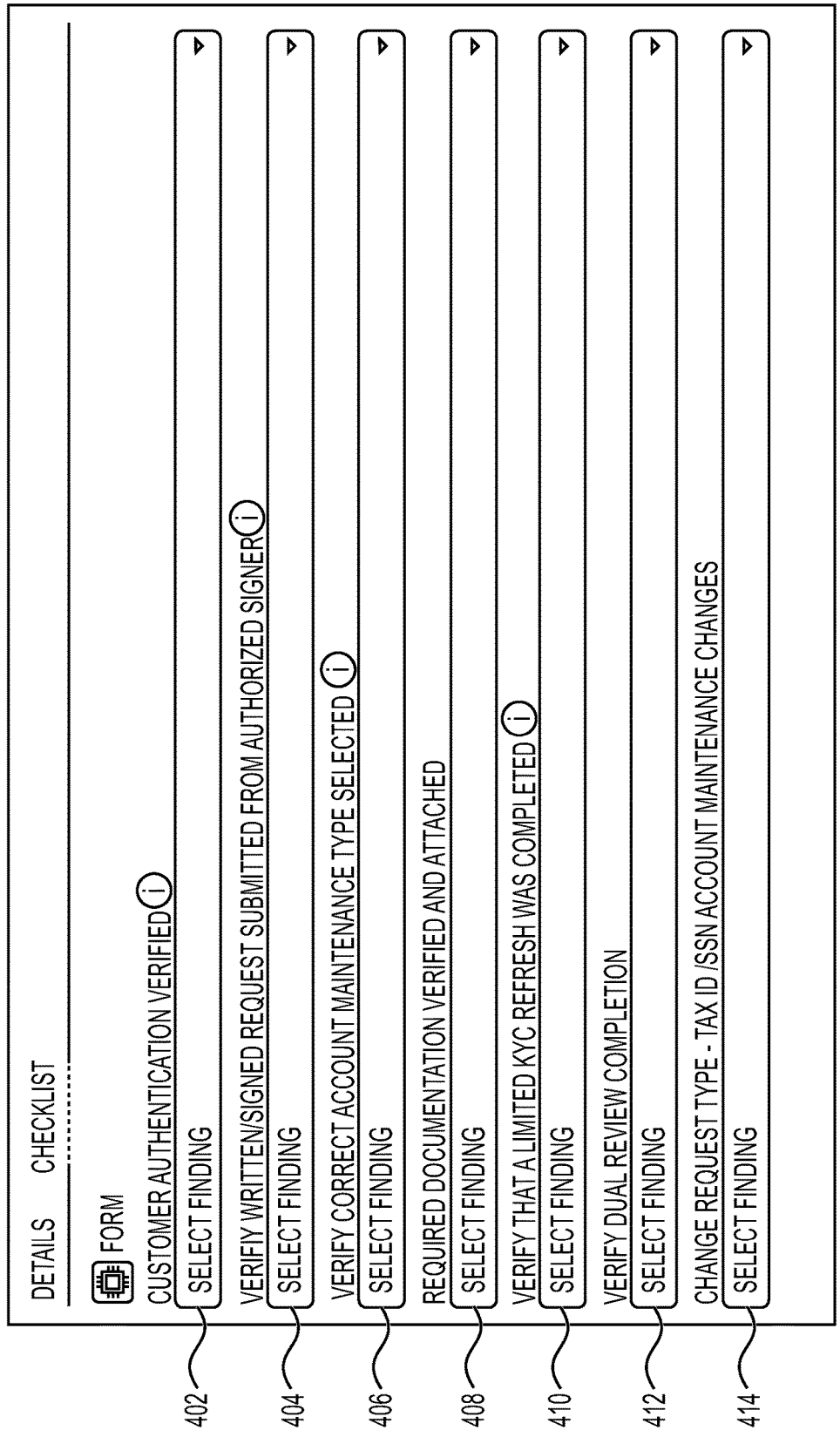
FIG. 4 depicts an exemplary electronic form, according to one or more embodiments.

FIG. 4 illustrates an example of an electronic form 400 that may be generated in accordance with the present disclosure. Electronic form 400 may include a plurality of prompt instances 402 to 414. Each of the prompt instances may include a data entry field and corresponding text. For example, as shown in FIG. 4, prompt instance 402 may include identifying text "CUSTOMER AUTHENTICATION VERIFIED" to identify for the user information requested. Prompt instances 402 may further include a drop down menu whereby the user may select "YES" or "NO," for example, to indicate whether customer authentication was indeed verified.

In some embodiments, electronic form 400 may be generated by server system 110 in response to a request transmitted by user device 105. Based on the request, server system 110 may retrieve a template from template container 114. The selected template may include a set of rules for incorporating prompts into the electronic form. Based on the rules, prompts from prompt container 112 may be instantiated to create electronic form 400. As used herein, the term "instantiate" refers to creating an instance, or a copy, of an object such as a prompt. By instantiating the prompts, the prompts may remain unaltered within prompt container 112 upon creation of electronic form 400. Moreover, data collected by a user completing electronic form 400 may be maintained separately from the prompts such that completion of electronic form 400 does not alter the prompts within prompt container 112. The same prompts may therefore be used again to generate other electronic forms.

Hereinafter, methods of using the computer environment 100 are described. In the methods described, various acts are described as performed or executed by one or more components shown in FIG. 1, such as user device 105, server system 110, prompt container 112, template container 114, or records container 116. However, it should be understood that in various embodiments, various components or combinations of components of the computing environment 100 discussed above may execute instructions or perform acts including the acts discussed below. An act performed by a device may be considered to be performed by a processor, actuator, or the like associated with that device. Further, it should be understood that in various embodiments, various steps may be added, omitted, and/or rearranged in any suitable manner.

Figure 5:
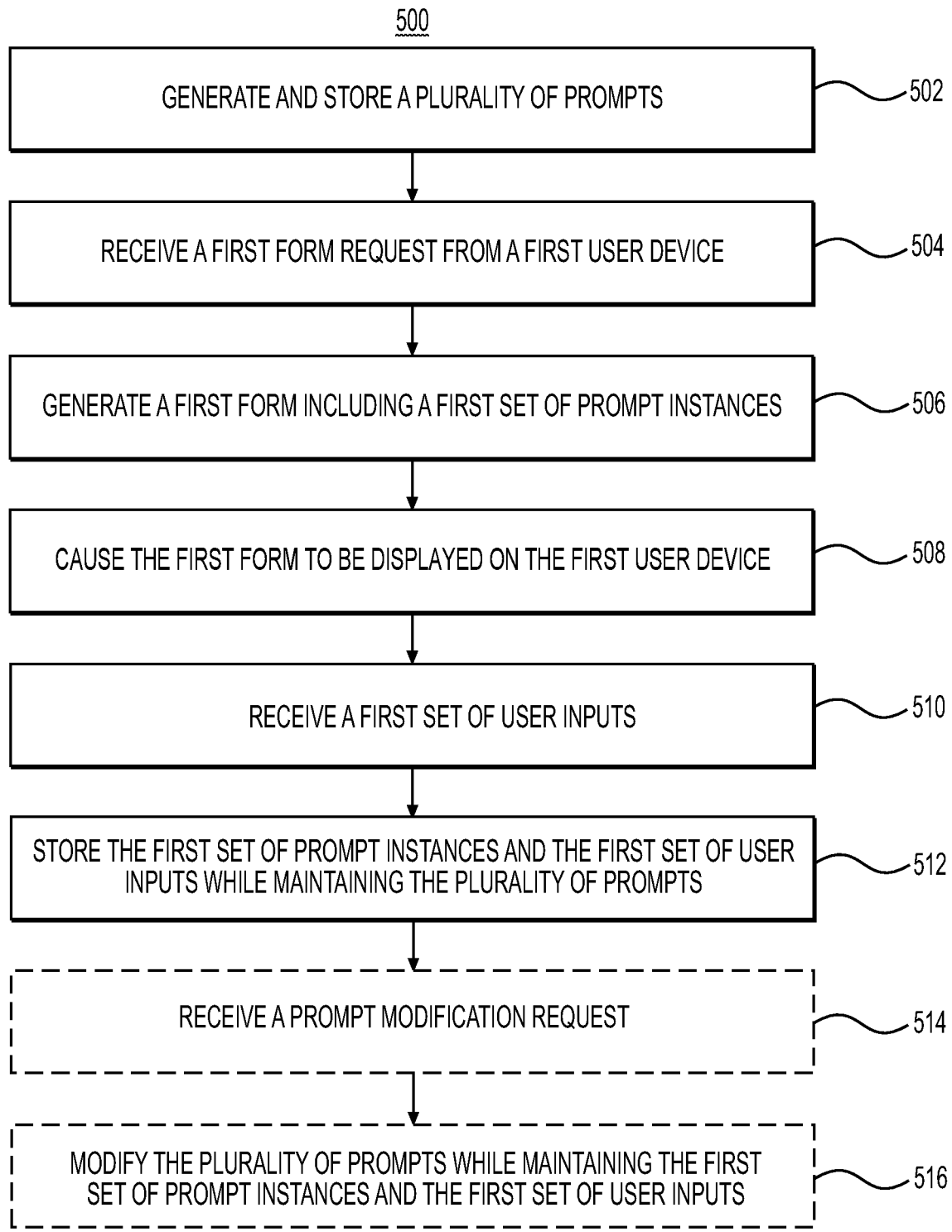
FIG. 5 depicts a flowchart of an exemplary method of generating and processing an electronic form, according to one or more embodiments.

FIG. 5 depicts an exemplary process 500 of generating and processing an electronic form, according to one or more embodiments. It is to be understood that the process 500 may include fewer than all steps shown in FIG. 5 or may alternatively include additional steps not shown in FIG. 5.

At step 502, server system 110 may generate and/or store a plurality of prompts. In some embodiments, server system 110 may generate each of the plurality of prompts in response to a request or series of requests from a user device 105. For example, a user may submit a request via a prompt creation dashboard such as prompt creation dashboard 300 described herein previously. In some embodiments, server system 110 may generate and/or store the prompts automatically. For example, server system 110 may be configured to generate and/or store a default set of prompts. Server system 110 may store the plurality of prompts in prompt container 112.

Each of the plurality of prompts generated and/or stored by server system 110 may include at least one user input field. For example, a prompt may include a question in text format. The user input field may allow a user to enter an answer to the question. In some embodiments, the prompt may instruct a user to enter data into the user input field in some manner other than via a text question. In some embodiments, the user input field may allow for free text entry, entry via a drop down menu, multiple choice selection, or any other suitable mechanism for collecting user input.

Additionally, each of the plurality of prompts may include one or more association tags. The association tags may indicate a subject or topic a prompt is related to, a team or unit a prompt is relevant to, a timeframe, or any other useful information relevant to the prompt. The association tags may allow server system 110 to filter the plurality of prompts to select relevant subsets of prompts for different electronic forms and/or different applications.

At step 504, server system 110 may receive a first form request from a first user device 105. In some embodiments, the user may transmit the first form request from first user device 105 to server system 110 by manually entering criteria for a desired form. As an example, the user may indicate one or more association tags by which to filter the prompts such that prompts including the one or more association tags are incorporated into the electronic form. As another example, the user may select individual prompts from prompt container 112 for inclusion into an electronic form. In some embodiments, the user may access template container 114 to select an electronic form template that is already associated with certain prompts. For example, if the user wishes to perform quality control on a customer support telephone call, the user may navigate to a template corresponding to customer support and may select that template. Such a template may be pre-associated with certain prompts in prompt container 112 relevant to quality control for a customer support telephone call.

At step 506, server system 110 may generate a first form including a first set of prompt instances based on the first form request. In some embodiments, depending on information provided by the user with the form request, server system 110 may retrieve one or more prompts from prompt container 112. For example, server system 110 may filter the prompts based on association tags provided with the first form request. As another example, server system 110 may retrieve prompts explicitly identified by the user. As another example, server system 110 may retrieve prompts associated with a template selected by the user. Server system 110 may then generate a set of prompt instances, where each of the prompt instances corresponds to one of the retrieved prompts. For example, the prompt instances may be duplicates of the prompts, which may be maintained in prompt container 112. Server system 110 may then incorporate the prompt instances into the first form and arrange them as indicated by the first form request. In effect, server system 110 may populate and arrange the first form with prompt instances corresponding to prompts stored in prompt container 112 while maintaining the prompts themselves undisturbed.

At step 508, server system 110 may cause the first form to be displayed on first user device 105. For example, server system 110 may transmit data representative of the first form to first user device 105, which may then display the first form to the user. In some embodiments, first user device 105 may display the first form to an individual tasked with completing the first form.

At step 510, server system 110 may receive a first set of user inputs from first user device 105. Each of the first set of user inputs may be associated with one or more of the prompt instances included in the first form. In some embodiments, each of the first set of user inputs may be answers corresponding to the prompt instances. Taking again an example in which a form may be used for quality control on a customer support telephone call, a prompt instance may ask the user whether the customer's problem was solved during the call. For such a prompt instance, a user input may be selection of one of the corresponding "YES" or "NO" answers. In some embodiments, a separate user input may be received for each prompt instance. Put another way, the first set of user inputs may amount to information collected in the first form.

At step 512, server system 110 may store the first set of prompt instances and the first set of user inputs. Server system 110 may store the first set of prompt instances and the first set of user inputs in a manner such that each user input is associated with a corresponding prompt instance. In some embodiments, server system 110 may store the first set of prompt instances and the first set of user inputs in records container 116 or otherwise segregated from prompts of prompt container 112 and/or templates of template container 114. Server system 110 may further store the first set of prompt instances and the first set of user inputs while maintaining the plurality of prompts. By doing so, server system 110 may maintain records of the first form, the prompt instances incorporated therein, and the user inputs entered for the prompt instances in a manner that is independent of the prompts. Accordingly, the prompts may be modified later as needed without disturbing the prompt instances and/or user inputs of the first form.

In some embodiments, process 500 may continue to step 514. At step 514, server system 110 may receive a prompt modification request. Server system 110 may receive the prompt modification from the same user via first user device 105 or from a second user via another user device. The prompt modification request may indicate to server system 110 to modify one or more prompts stored in prompt container 112. Modification may include altering one or more association tags included with a prompt, altering a user input field of a prompt, or any other such alteration to a prompt. Prompt modification requests may be made when enterprise protocols change, business realities change, or for any other reason.

In some embodiments, process 500 may continue to step 516. At step 516, server system 110 may modify one or more of the plurality of prompts in response to the prompt modification request and as indicated in the prompt modification request, such as by altering association tags included with a prompt, altering a user input field, or the like. Server system 110 may further perform such modification to the one or more prompts in prompt container 112 while maintaining the first set of prompt instances and the first set of user inputs stored in step 512. By doing so, server system 110 may modify the prompts without disturbing records of the first form, the prompt instances incorporated therein, and the user inputs entered for the prompt instances. Accordingly, the first form, the prompt instances incorporated therein, and the user inputs may be made accessible in the future for data intelligence, generation of reports, or the like, despite subsequent modifications to the prompts. More specifically, in some embodiments, a user may request generation of a report with certain parameters. By obtaining user inputs for like prompt instances, trends in the user inputs over time may be indicated by the report regardless of whether the forms containing those prompt instances changed over time in structure, sequence, or the like.

It is to be understood that process 500 need not necessarily be performed in the exact order described herein and the steps described herein may be rearranged in some embodiments. Further, in some embodiments fewer than all steps of process 500 may be performed and in some embodiments additional steps may be performed.

Figure 6:
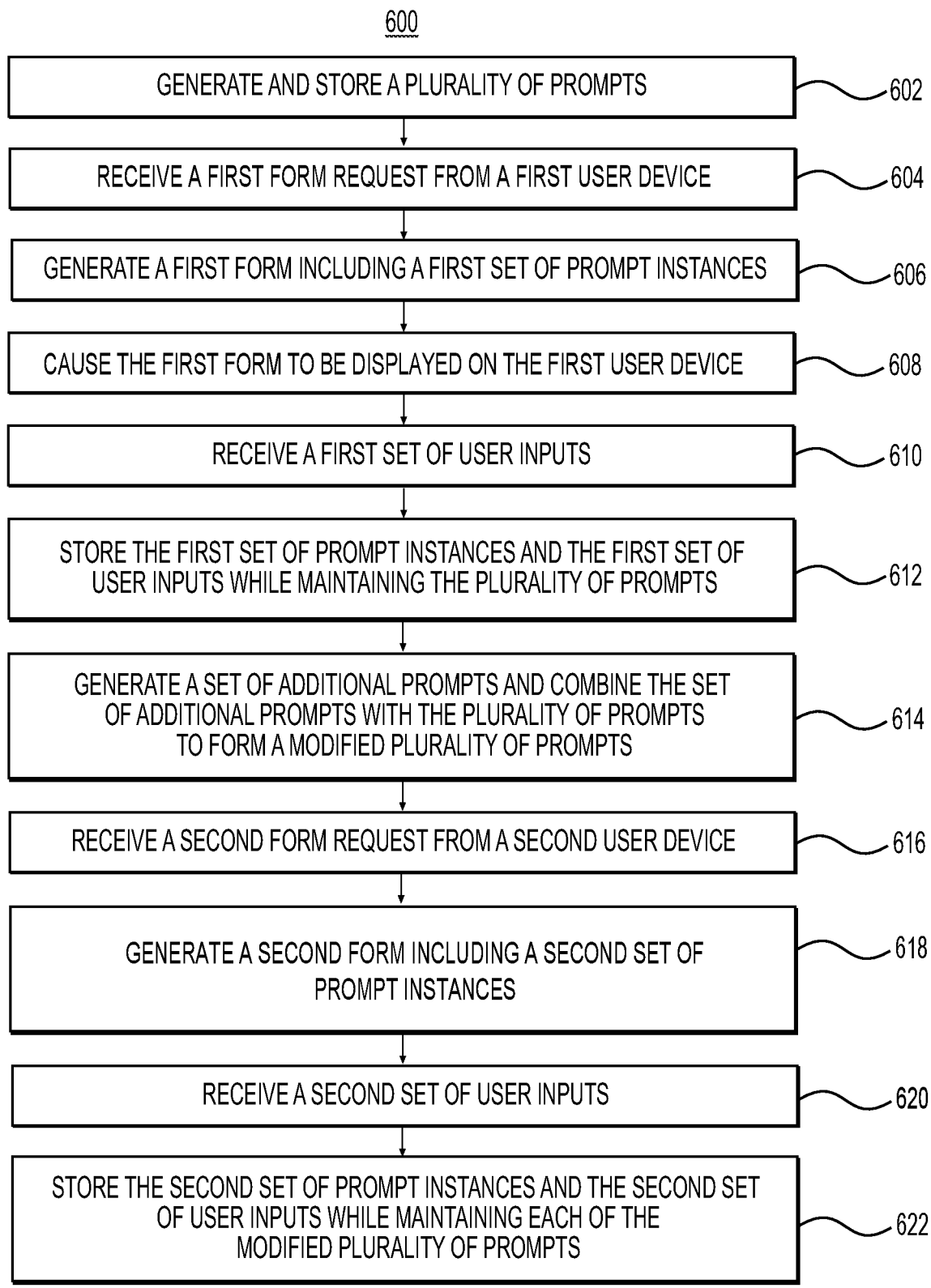
FIG. 6 depicts a flowchart of an exemplary method of generating and processing an electronic form, according to one or more embodiments.

FIG. 6 depicts an exemplary process 600 of generating and processing an electronic form, according to one or more embodiments. It is to be understood that the process 600 may include fewer than all steps shown in FIG. 6 or may alternatively include additional steps not shown in FIG. 6.

At step 602, server system 110 may generate and/or store a plurality of prompts. In some embodiments, server system 110 may generate each of the plurality of prompts in response to a request or series of requests from user device 105. For example, a user may submit a request via a prompt creation dashboard such as prompt creation dashboard 300 described herein previously. In another example, multiple users may submit requests via prompt creation dashboards. As described previously with reference to step 502, server system 110 may automatically generate the prompts and/or store the prompts in prompt container 112.

At step 604, server system 110 may receive a first form request from a first user device 105. As described herein previously with reference to step 504, the user may transmit the first form request from first user device 105 by manually entering criteria for a desired form, by indicating one or more association tags, selecting individual prompts from prompt container 112, and/or selecting an electronic form template that is already associated with certain prompts.

At step 606, server system 110 may generate a first form including a first set of prompt instances based on the first form request. As described herein previously with reference to step 506, server system 110 may retrieve one or more prompts from prompt container 112 based on association tags provided with the first form request, may retrieve prompts explicitly identified by the user, and/or may retrieve prompts associated with a template. Server system 110 may then generate a set of prompt instances, where each of the prompt instances corresponds to one of the retrieved prompts. Server system 110 may then incorporate the prompt instances into the first form and arrange them as indicated by the first form request.

At step 608, server system 110 may cause the first form to be displayed on first user device 105. For example, server system 110 may transmit data representative of the first form to first user device 105, which may then display the first form to the user. In some embodiments, first user device 105 may display the first form to an individual tasked with completing the first form.

At step 610, server system 110 may receive a first set of user inputs from a first user device 105. Each of the first set of user inputs may be associated with one or more of the prompt instances included in the first form. As described previously with reference to step 510, each of the first set of user inputs may be answers corresponding to the prompt instances and a separate user input may be received for each prompt instance.

At step 612, server system 110 may store the first set of prompt instances and the first set of user inputs. Server system 110 may store the first set of prompt instances and the first set of user inputs in a manner such that each user input is associated with a corresponding prompt instance. In some embodiments, server system 110 may store the first set of prompt instances and the first set of user inputs in records container 116 or otherwise segregated from prompts of prompt container 112 and/or templates of template container 114. Server system 110 may further store the first set of prompt instances and the first set of user inputs while maintaining the plurality of prompts.

At step 614, server system 110 may generate a set of additional or new prompts. The additional prompts may be generated in any manner described herein. In some embodiments, the additional prompts may be generated due to changes in an enterprise's products or services, evolving business practices, or the like. Server system 110 may combine the additional prompts with the plurality of prompts already stored in prompt container 112 to create a modified plurality of prompts.

At step 616, server system 110 may receive a second form request from a second user device 105 other than first user device 105. The second form request may be caused to be transmitted to server system 110 by a second user. Similarly to the first form request, the second user may transmit the second form request from the second user device by manually entering criteria for a desired form, by indicating one or more association tags, selecting individual prompts from prompt container 112, and/or selecting an electronic form template that is already associated with certain prompts. The second user may transmit such a second form request if the user wishes to generate a form different than the first form.

At step 618, server system 110 may generate a second form including a second set of prompt instances based on the second form request. In some embodiments, server system 110 may retrieve one or more of the modified plurality of prompts from prompt container 112 based on association tags provided with the second form request, may retrieve prompts explicitly identified by the user, and/or may retrieve prompts associated with a template. Server system 110 may then generate a second set of prompt instances, where each of the prompt instances corresponds to one of the retrieved prompts. Server system 110 may then incorporate the prompt instances into the second form and arrange them as indicated by the second form request.

At step 620, server system 110 may receive a second set of user inputs from the second user device 105. Each of the second set of user inputs may be associated with one or more of the prompt instances included in the second form. Similarly to the first set of user inputs, each of the second set of user inputs may be answers corresponding to the prompt instances and a separate user input may be received for each prompt instance. Put another way, the second set of user inputs may be information collected by the second form.

At step 622, server system 110 may store the second set of prompt instances and the second set of user inputs. Server system 110 may store the second set of prompt instances and the second set of user inputs in a manner such that each user input is associated with a corresponding prompt instance. In some embodiments, server system 110 may store the second set of prompt instances and the second set of user inputs in records container 116 or otherwise segregated from prompts of prompt container 112 and/or templates of template container 114. Server system 110 may further store the second set of prompt instances and the second set of user inputs while maintaining the modified plurality of prompts.

It is to be understood that process 600 need not necessarily be performed in the exact order described herein and the steps described herein may be rearranged in some embodiments. Further, in some embodiments fewer than all steps of process 500 may be performed and in some embodiments additional steps may be performed.

Process 600 as described herein may allow for the generation of multiple forms using prompts from prompt container 112. Each of the forms may be requested by separate users, completed by separate users, and the information collected by the forms may be saved to records container 116 such that the information is accessible and analyzable. In addition, prompts within prompt container 112 may be changed, updated, and/or added to over time without disrupting or otherwise changing the information collected from the completed forms. In this way, information collected from electronic forms may be maintained over time, even as needs for future forms change. As a result, generation and modification of forms may be simplified as new prompts may be created and associated with an existing form, rather than recreating the form from scratch. Additionally, data collected via different forms having overlapping prompts may be effectively compared even though the forms are not exactly the same. This may allow for advanced data analysis over time as overall forms change, but certain prompts remain in use.

Further aspects of the disclosure are discussed below. It should be understood that embodiments in this disclosure are exemplary only, and that other embodiments may include various combinations of features from other embodiments, as well as additional or fewer features.

In general, any process discussed in this disclosure that is understood to be computer-implementable, such as the processes illustrated in FIGS. 5 and 6, may be performed by one or more processors of a computer system. A process or process step performed by one or more processors may also be referred to as an operation. The one or more processors may be configured to perform such processes by having access to instructions (e.g., software or computer-readable code) that, when executed by the one or more processors, cause the one or more processors to perform the processes. The instructions may be stored in a memory of the computer system. A processor may be a central processing unit (CPU), a graphics processing unit (GPU), or any suitable types of processing unit.

A computer system may include one or more computing devices. If the one or more processors of the computer system are implemented as a plurality of processors, the plurality of processors may be included in a single computing device or distributed among a plurality of computing devices. If a computer system comprises a plurality of computing devices, the memory of the computer system may include the respective memory of each computing device of the plurality of computing devices.

Figure 7:
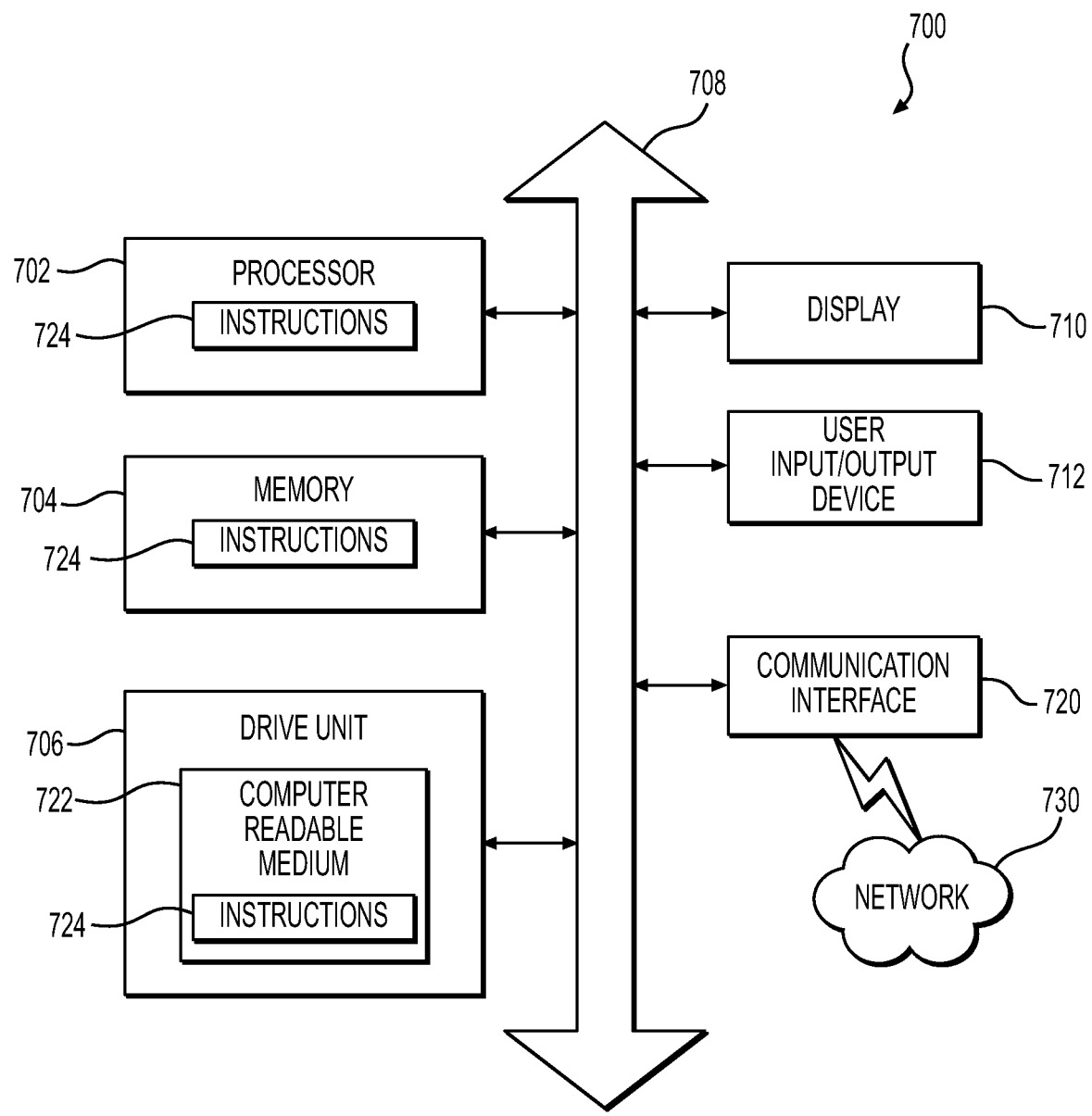
FIG. 7 depicts an example of a computing device, according to one or more embodiments.

FIG. 7 is a simplified functional block diagram of a computer system 800 that may be configured as a device for executing the processes of FIGS. 5 and 6, according to exemplary embodiments of the present disclosure. FIG. 7 is a simplified functional block diagram of a computer that may be configured to serve as the user device 105, the server system 110, the container 112, template container 114, and/or records container 116, according to exemplary embodiments of the present disclosure. In various embodiments, any of the systems herein may be an assembly of hardware including, for example, a data communication interface 720 for packet data communication. The platform also may include a central processing unit ("CPU") 702, in the form of one or more processors, for executing program instructions. The platform may include an internal communication bus 708, and a storage unit 706 (such as ROM, HDD, SDD, etc.) that may store data on a computer readable medium 722, although the system 700 may receive programming and data via network communications including via network 125. The system 700 may also have a memory 704 (such as RAM) storing instructions 724 for executing techniques presented herein, although the instructions 724 may be stored temporarily or permanently within other modules of system 700 (e.g., processor 702 and/or computer readable medium 722). The system 700 also may include input and output ports 712 and/or a display 710 to connect with input and output devices such as keyboards, mice, touchscreens, monitors, displays, etc. The various system functions may be implemented in a distributed fashion on a number of similar platforms, to distribute the processing load. Alternatively, the systems may be implemented by appropriate programming of one computer hardware platform.

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

While the presently disclosed methods, devices, and systems are described with exemplary reference to diagnosing a technology environment, it should be appreciated that the presently disclosed embodiments may be applicable to navigating and/or monitoring a technology environment for any other purpose.

Other embodiments of the disclosure will be apparent to those skilled in the art from consideration of the specification and practice of the disclosure disclosed herein. It is intended that the specification and examples be considered as exemplary only, with a true scope and spirit of the disclosure being indicated by the following claims.

In general, any process discussed in this disclosure that is understood to be performable by a computer may be performed by one or more processors. Such processes include, but are not limited to: the processes depicted in FIGS. 5, 6, and 7, and the associated language of the specification. The one or more processors may be configured to perform such processes by having access to instructions (computer-readable code) that, when executed by the one or more processors, cause the one or more processors to perform the processes. The one or more processors may be part of a computer system (e.g., one of the computer systems discussed above) that further includes a memory storing the instructions. The instructions also may be stored on a non-transitory computer-readable medium. The non-transitory computer-readable medium may be separate from any processor. Examples of non-transitory computer-readable media include solid-state memories, optical media, and magnetic media.

It should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those skilled in the art. For example, in the following claims, any of the claimed embodiments can be used in any combination.

Thus, while certain embodiments have been described, those skilled in the art will recognize that other and further modifications may be made thereto without departing from the spirit of the invention, and it is intended to claim all such changes and modifications as falling within the scope of the invention. For example, functionality may be added or deleted from the block diagrams and operations may be interchanged among functional blocks. Steps may be added or deleted to methods described within the scope of the present invention.

The above disclosed subject matter is to be considered illustrative, and not restrictive, and the appended claims are intended to cover all such modifications, enhancements, and other implementations, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description. While various implementations of the disclosure have been described, it will be apparent to those of ordinary skill in the art that many more implementations are possible within the scope of the disclosure. Accordingly, the disclosure is not to be restricted except in light of the attached claims and their equivalents.

What is claimed is:

1. A computer-implemented method comprising:
    generating and storing a plurality of prompts, each of the plurality of prompts including a user input field;
    receiving a first form request from a first user device;
    generating, based on the first form request, a first form indicative of one or more of the plurality of prompts;
    causing the first form to be displayed on the first user device;
    receiving, from the first user device, a first set of user inputs, each of the first set of user inputs being associated with one or more of the plurality of prompts;
    storing a set of prompt instances corresponding to the one or more of the plurality of prompts and the first set of user inputs;
    receiving, from the first user device or a second user device, a prompt modification request; and
    modifying, in response to the prompt modification request, at least one of the plurality of prompts while maintaining the set of prompt instances and the first set of user inputs.

2. The computer-implemented method of claim 1, wherein the plurality of prompts are maintained when the set of prompt instances are stored.

3. The computer-implemented method of claim 1, further comprising:
    receiving, from the first user device or a second user device, a prompt generation request; and
    generating, in response to the prompt generation request, an additional set of prompts and storing the additional set of prompts among the plurality of prompts.

4. The computer-implemented method of claim 1, wherein modifying the at least one of the plurality of prompts includes altering one or more association tags associated with the at least one of the plurality of prompts.

5. The computer-implemented method of claim 1, wherein modifying the at least one of the plurality of prompts includes altering one or more user input fields associated with the at least one of the plurality of prompts.

6. The computer-implemented method of claim 1, further comprising:
    receiving a first report request;
    generating, in response to the first report request, a first report indicative of the first set of user inputs.

7. The computer-implemented method of claim 6, further comprising:
    receiving, from the first user device or a second user device, a second set of user inputs, each of the second set of user inputs being associated with one or more of the plurality of prompts;
    receiving a second report request;
    generating, in response to the second report request, a second report indicative of the second set of user inputs.

8. A non-transitory computer-readable medium storing instructions that, when executed by one or more processors, cause the one or more processors to perform operations comprising:
    generating and storing a plurality of prompts, each of the plurality of prompts including a user input field;
    receiving a first form request from a first user device;
    generating, based on the first form request, a first form indicative of one or more of the plurality of prompts;
    causing the first form to be displayed on the first user device;
    receiving, from the first user device, a first set of user inputs, each of the first set of user inputs being associated with one or more of the plurality of prompts;
    storing a set of prompt instances corresponding to the one or more of the plurality of prompts and the first set of user inputs;
    receiving, from the first user device or a second user device, a prompt modification request; and
    modifying, in response to the prompt modification request, at least one of the plurality of prompts while maintaining the set of prompt instances and the first set of user inputs.

9. The non-transitory computer-readable medium of claim 8, wherein the plurality of prompts are maintained when the set of prompt instances are stored.

10. The non-transitory computer-readable medium of claim 8, wherein the operations further comprise:
    receiving, from the first user device or a second user device, a prompt generation request; and
    generating, in response to the prompt generation request, an additional set of prompts and storing the additional set of prompts among the plurality of prompts.

11. The non-transitory computer-readable medium of claim 8, wherein modifying the at least one of the plurality of prompts includes altering one or more association tags or input fields associated with the at least one of the plurality of prompts.

12. The non-transitory computer-readable medium of claim 8, wherein the operations further comprise:
receiving a first report request;
generating, in response to the first report request, a first report indicative of the first set of user inputs.

13. The non-transitory computer-readable medium of claim 12, wherein the operations further comprise:
receiving, from the first user device or a second user device, a second set of user inputs, each of the second set of user inputs being associated with one or more of the plurality of prompts;
receiving a second report request;
generating, in response to the second report request, a second report indicative of the second set of user inputs.

14. A system for generating and processing electronic forms, the system comprising:
one or more memories storing instructions; and
one or more processors operatively connected to the one or more memories, the one or more processors configured to execute the instructions to:
generate and store a plurality of prompts, each of the plurality of prompts including a user input field;
receive a first form request from a first user device;
generate, based on the first form request, a first form indicative of one or more of the plurality of prompts;
cause the first form to be displayed on the first user device;
receive, from the first user device, a first set of user inputs, each of the first set of user inputs being associated with one or more of the plurality of prompts; and
store a set of prompt instances corresponding to the one or more of the plurality of prompts and the first set of user inputs;
receive, from the first user device or a second user device, a prompt modification request; and
modify, in response to the prompt modification request, at least one of the plurality of prompts while maintaining the set of prompt instances and the first set of user inputs.

15. The system of claim 14, wherein the plurality of prompts are maintained when the set of prompt instances are stored.

16. The system of claim 14, wherein the one or more processors are further configured to execute the instructions to:
receive, from the first user device or a second user device, a prompt generation request; and
generate, in response to the prompt generation request, an additional set of prompts and storing the additional set of prompts among the plurality of prompts.

17. The system of claim 14, wherein modifying the at least one of the plurality of prompts includes altering one or more association tags associated with the at least one of the plurality of prompts.

\* \* \* \* \*